United States Patent [19]
Jarrault

[11] 3,786,565

[45] Jan. 22, 1974

[54] PROCESS FOR MANUFACTURING FALSE TEETH

[75] Inventor: Maurice Louis Jarrault, Fresnes, France

[73] Assignee: Societe Civile d'Etudes Et De Recherches Pour L'Application De La Ceramique Dentaire en abreviation S.E.R.A.C., Paris, France

[22] Filed: Mar. 6, 1972

[21] Appl. No.: 232,230

[52] U.S. Cl. ................................................ 32/8
[51] Int. Cl. ........................................ A61c 13/00
[58] Field of Search ................................... 32/2, 8

[56] References Cited
UNITED STATES PATENTS

| | | | |
|---|---|---|---|
| 3,423,828 | 1/1969 | Halpern et al. | 32/8 |
| 3,541,688 | 11/1970 | McLean | 32/8 |
| 3,423,829 | 1/1969 | Halpern et al. | 32/8 |

*Primary Examiner*—Robert Peshock
*Attorney, Agent, or Firm*—Brown, Murray, Flick & Peckham

[57] ABSTRACT

A process for manufacturing false teeth constituted of a metallic frame made of non-precious metal, for example, chromium-nickel or cobalt-chromium, this frame being coated with various layers of dental porcelain having a medium melting-point, this process being note-worthy for there is laid down on the frame which is in the form of a cap, fine particles of metallic brazing of cobalt-chromium so as to form on the outer face of the frame, positive retentions, then, a physicochemical binder, burnt under vacuum, is applied on the said frame, afterwards, porcelain layers are laid down and burnt as usual.

8 Claims, No Drawings

PROCESS FOR MANUFACTURING FALSE TEETH

The present invention relates to a process for manufacturing false teeth constituted of a metallic frame made of non-precious metal, coated with an envelope of dental porcelain having a medium-melting point.

For the time being, the burning of dental porcelain having a medium melting-point is only possible if it is effected on special gold alloys having a high-grade of platinum. Mechanical qualities of those alloys are disappointing, because they notably have a weak stiffness and a low modulus of elasticity; important restorations cannot be carried out. As those alloys are not sufficiently strong, it is necessary to make a frame having very thick walls, which, consequently, reduces the depth of the cavity of this frame and forces the pratician to exaggeratedly file off the remaining of real tooth onto which the ceramo-metallic dental prosthesis is to be fitted.

Besides, the burning of dental porcelain on non-precious metal has proved disappointing; because of the very weak sticking of porcelain to metal. Under the influence of a pull the layer of oxide closely sticks to porcelain and not to metal.

The purpose of the invention is to remedy these drawbacks and relates to a new process allowing to obtain a perfect sticking of dental porcelain to a non-precious alloy.

Then the invention relates to a process for manufacturing false teeth constituted of a frame of a non-precious metal coated with various layers of dental porcelain having a medium melting-point, a process wherein there is laid down onto the surface of the frame, so as to form positive retentions, fine particles of metallic brazing having a factor of expansion substantially equal to that of the metal constituting the frame. Then there is applied on the frame a physico-chemical binder which is burnt under vacuum, afterwards, porcelain layers are laid down and burnt as usual.

According to another characteristic of the invention, the particles of brazing are laid down by means of a blow-lamp having a low voltage.

According to another characteristic of the invention, the brazing is cobalt-chromium.

The perfect sticking of the dental porcelain to the metallic frame made of non-precious metal is obtained thanks to the fact that two binders, one mechanical, the other physico-chemical, are complementary to each other:

a. mechanical binder: microscopic mechanical positive retentions are carried out onto the surface of the metallic frame. The frame has a thickness of 5/10 of mm which secures a perfect, homogeneous and without holes casting. By means of suitable abrasives, the frame is reduced to 3/10 of mm on its surface and to 2/10 of mm on its cervix edges. By means of a laboratory blow-lamp having a low voltage and of a cobalt-chromium brazing, microscopic positive retentions are laid down. This laying down is to be applied on the surface of the frame, on angles excepted, free and cervix edges.

b. physico-chemical binder: this chemical bridge is broadly constituted of fluxes: tetraborate of sodium, silicate of sodium which make possible the subjacent oxides of metal to be dissolved and contribute to form an intermediate layer which bonds the enamel to the metal. Potassium, barium, calcium and pure silica carbonates are added to those fluxes. There is added to this formula about 20 percent of opaque ceramic of the same porcelain brand as that regularly used, as well as vegetable oil so as to obtain a creamy consistency. By means of a fine brush this solution is spread over all the surface of the metallic frame. It is progressively dried and put into an oven at 250° C, then a high-efficiency vacuum is made therein. The burning is made under vacuum at 1025°/1050° C. The piece is taken out and allowed to get cold. The opaque and various layers of porcelain are burnt as usual.

Formula of the physico-chemical binder:

$SiO_2$— 55 to 65 percent
$Na_2B_4O_7, 10H_2O$— 8 to 12 percent
$K_2CO_3$— 1 to 3 percent
$3SiO_2, Na_2O, 3H_2O$— 1 to 5 percent
$BaCO_3$— 8 to 12 percent
$SnO_2$— 10 to 16 percent
$CaO$— 1 to 3 percent As far as the dental carving is concerned, it is advisable to make it taking into account the dynamic and functional occlusion, avoiding the well-known overhangs, as well as too sharp cusps.

In short, this process object of the invention bears on the strong sticking of dental porcelain having a medium melting-point, to non-precious alloys.

It allows to carry out fixed dental prostheses made of ceramic, having a long bearing surface, a tested strength and a low prime cost.

1. A process for manufacturing false feeth constituted of a metallic frame made of non-precious metal coated with various layers of dental porcelain having a medium melting-point, the process comprising laying down into the surface of the frame fins particles of metallic brazing having a factor of expansion substantially equal to that of the metal constituting the frame to thereby form positive retentions, then applying to the frame a physico-chemical binder burnt under vacuum, then applying to said binder layers of porcelain, and burning said layers.

2. A process according to claim 1, wherein said particles of brazing are layed down by means of a blow lamp having a low voltage.

3. A process according to claim 1, wherein said brazing particles are cobalt-chromium.

4. A process according to claim 1, wherein the frame is heated before applying binder thereon.

5. A process according to claim 1, wherein the binder is burnt at a temperature close to 1020° C.

6. A process according to claim 1, wherein the burning of the binder is carried out under a high-efficiency vacuum.

7. A process according to claim 1, wherein the binder is essentially constituted of a high-grade of potassium, sodium, silica and calcium.

8. A false tooth obtained by working out the process according to claim 1.

* * * * *

UNITED STATES PATENT OFFICE
CERTIFICATE OF CORRECTION

Patent No. 3,786,565                                   Dated  January 22, 1974

Inventor(s)  Maurice Louis Jarrault

It is certified that error appears in the above-identified patent and that said Letters Patent are hereby corrected as shown below:

Column 1, after the Serial Number, insert

--Claims priority, application France, March 9, 1971, application 71.08017--.

Signed and sealed this 17th day of September 1974.

(SEAL)
Attest:

McCOY M. GIBSON JR.                        C. MARSHALL DANN
Attesting Officer                          Commissioner of Patents